(12) United States Patent
Morozov et al.

(10) Patent No.: US 11,473,033 B1
(45) Date of Patent: *Oct. 18, 2022

(54) DRAG REDUCING AGENT CONTAINING A GREAT AMOUNT OF AN ACTIVE BASE

(71) Applicant: IRIS TECH, INC., Houston, TX (US)

(72) Inventors: Vladimir Dmitrievich Morozov, Mamadysh (RU); Aleksandr Aleksandrovich Nikitin, Kazan (RU); Igor Aleksandrovich Malykhin, Moscow (RU)

(73) Assignee: IRIS TECH, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,193

(22) Filed: Jan. 4, 2022

(51) Int. Cl.
  *C10M 169/04* (2006.01)
  *C10M 107/28* (2006.01)
  (Continued)

(52) U.S. Cl.
  CPC ......... *C10M 169/044* (2013.01); *C09K 8/035* (2013.01); *C10G 71/00* (2013.01); *C10M 107/10* (2013.01); *C10M 107/28* (2013.01); *C10M 129/08* (2013.01); *C10M 129/40* (2013.01); *C10M 133/16* (2013.01); *C10M 137/04* (2013.01); *C10M 141/10* (2013.01); *C10M 145/28* (2013.01);
  (Continued)

(58) Field of Classification Search
  CPC ............ C10M 169/044; C10M 107/10; C10M 107/28; C10M 129/08; C10M 129/40; C10M 133/16; C10M 137/04; C10M 141/10; C10M 145/28; C10M 155/02; C10M 161/00; C10M 2205/0285; C10M 2207/022; C10M 2207/126; C10M 2209/0845; C10M 2209/104; C10M 2215/28; C10M 2223/04; C10M 2229/041; C09K 8/035; C09K 2208/28; C10G 71/00; F17D 1/16

See application file for complete search history.

(56) References Cited

U.S. PATENT DOCUMENTS 6,172,151 B1 * 1/2001 Johnston ................... F17D 1/16
                                                        524/379
6,894,088 B2 * 5/2005 Motier ........................ C08J 3/12
                                                        208/370

(Continued)

*Primary Examiner* — Pamela H Weiss
(74) *Attorney, Agent, or Firm* — Nadya Reingand

(57) ABSTRACT

The invention relates to agents reducing the hydrodynamic drag of a turbulent flow of petroleum products in the process of transportation in pipelines. The technical result of the solution involves the preservation of the polymer structure so that the polymer is more effective in reducing the hydrodynamic drag, grinding costs in the production of the DRA, the aggregation of the DRA while reducing the amount of the separating agent and the need to inject a smaller amount of the reagent to reduce the hydrodynamic drag. The specified technical result is produced due to the development of a reagent for reducing the hydrodynamic drag of hydrocarbon liquids in pipelines, which consists of the first and the second component, in which case the first component comprises the particles of polyalphaolefin or polyacrylate, the second component is an anti-agglomerating agent.

5 Claims, 1 Drawing Sheet

(51) Int. Cl.
  *C10M 129/08* (2006.01)
  *C10M 145/28* (2006.01)
  *C10M 155/02* (2006.01)
  *C10M 129/40* (2006.01)
  *C10M 133/16* (2006.01)
  *C10M 137/04* (2006.01)
  *C10M 141/10* (2006.01)
  *C10M 161/00* (2006.01)
  *C10G 71/00* (2006.01)
  *C10M 107/10* (2006.01)
  *C09K 8/035* (2006.01)
  *F17D 1/16* (2006.01)

(52) U.S. Cl.
  CPC ........ *C10M 155/02* (2013.01); *C10M 161/00* (2013.01); *C09K 2208/28* (2013.01); *C10M 2205/0285* (2013.01); *C10M 2207/022* (2013.01); *C10M 2207/126* (2013.01); *C10M 2209/0845* (2013.01); *C10M 2209/104* (2013.01); *C10M 2215/28* (2013.01); *C10M 2223/04* (2013.01); *C10M 2229/041* (2013.01); *F17D 1/16* (2013.01)

(56) References Cited

U.S. PATENT DOCUMENTS

| | | | |
|---|---|---|---|
| 6,948,500 B2 * | 9/2005 | Bierman | A61M 25/02 128/202.18 |
| 2006/0276566 A1 * | 12/2006 | Mathew | C08J 3/11 523/175 |
| 2007/0284110 A1 * | 12/2007 | Harris | E21B 43/12 166/310 |
| 2008/0139696 A1 * | 6/2008 | Bucher | F17D 1/17 523/175 |
| 2009/0107554 A1 * | 4/2009 | Milligan | B01J 19/2435 524/394 |
| 2009/0111714 A1 * | 4/2009 | Burden | C08J 3/02 507/90 |
| 2010/0029843 A1 * | 2/2010 | Milligan | C08F 2/20 524/607 |
| 2012/0000544 A1 * | 1/2012 | Bao | F17D 1/16 137/13 |
| 2014/0206794 A1 * | 7/2014 | Bucher | F17D 1/17 523/175 |
| 2020/0392425 A1 * | 12/2020 | Vittur | C10L 1/1641 |

* cited by examiner

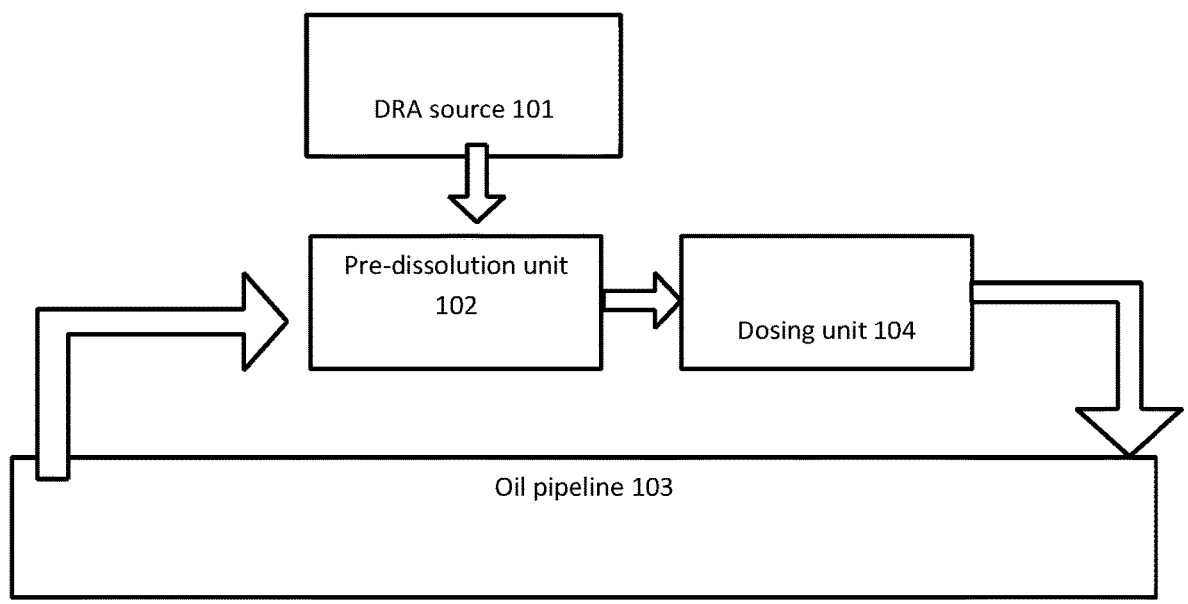

DRAG REDUCING AGENT CONTAINING A GREAT AMOUNT OF AN ACTIVE BASE

FIELD OF THE INVENTION

This invention is used in the oil and petrochemical industry for the pipeline transport of liquid hydrocarbons, namely, for reducing the hydrodynamic resistance during transportation. The proposed invention relates to drag reducing agents (DRA), which reduce the hydrodynamic drag of a turbulent flow of hydrocarbon fluids in pipelines, that is DRA dry dispersions (DD) of a high and ultra-high molecular weight (UHMW) (co) polymers, which reduce the hydrodynamic drag in pipelines.

BACKGROUND

There are microencapsulated drag reducing agents (U.S. Pat. No. 6,126,872A, publ. on 2000 Oct. 3). These high concentration drag reducing agents may be prepared by microencapsulating polymer reagent. The microencapsulation may be performed before, during, or after the polymerization of monomer into effective drag reducing polymer. If encapsulation is done before or during polymerization, a catalyst may be present, but no solvent is required. The result is very small-scale bulk polymerization within the microcapsule. The inert capsule or shell may be removed before, during, or after the introduction of the microencapsulated drag reducer into a flowing liquid. No injection probes or other special equipment is expected to be required to introduce the drag reducing slurry into the liquid stream, nor is cryogenic grinding of the polymer necessary.

But a reagent of shell size less than 1.5 mm is used in this solution, which limits the size of the polymer inside the shell, the polymer content in the shell is less than 70%, and it is even less in the reagent after mixing with water, the mass of the anti-agglomerating agent makes from 25% up to 75% of the total mass of the reagent.

There are microencapsulated and macroencapsulated drag reducing agents (U.S. Pat. No. 6,841,593B2, publ. on 2003 Jan. 16). According to this solution, high concentration drag reducing agents may be prepared by microencapsulating and/or macroencapsulating polymer drag reducing agents. The encapsulation may be performed before, during, or after the polymerization of the monomer into an effective drag reducing polymer. If encapsulation is done before or during polymerization, a catalyst may be present, but no solvent is required. The result is very small-scale bulk polymerization within the capsule. The inert capsule or shell may be removed before, during, or after the introduction of the encapsulated drag reducer into a flowing liquid. No injection probes or other special equipment is expected to be required to introduce the drag reducing slurry into the liquid stream, nor is cryogenic grinding of the polymer necessary.

But according to this solution, the reagent is mixed with water or another solvent before injecting to dissolve the shell, so a great amount of water together with the polymer reagent gets into the oil pipeline. The content of the polymer reagent even in the shell is about 76%, but its content decreases when it is mixed with water. The mass of the anti-agglomerating agent makes from 25% to 75% of the total mass of the reagent.

There is a method for producing drag reducing agents with high content of active base and a method for supplying it into the flow of hydrocarbon liquid transported in the pipeline (RU2743532C1, publ. on 19 Feb. 2021). The invention relates to the transportation of oil and petroleum products using pipelines. The invention relates to a method for producing a reagent for reducing the hydrodynamic resistance of a turbulent flow of liquid hydrocarbons in pipelines, characterized by a high (not less than 75 wt %) content of polyalphaolefin including mixing a finely dispersed polyalphaolefin powder having the properties of reducing the hydrodynamic resistance of a turbulent flow of liquid hydrocarbons of 0.1-1.5 mm with non-dissolving solvents consisting of a mixture of a monofunctional heteroatomic organic compound with the number of carbon atoms from 3 to 16, containing oxygen, nitrogen as a heteroatom and a bifunctional heteroatomic organic compound with the number of carbon atoms from 2 to 16, containing oxygen, nitrogen, sulfur, phosphorus as a heteroatom and a separating agent (anti-agglomerating agent) with the following ratio of components in composition, wt %: finely dispersed polyalphaolefin powder—from 75 to 90, separating agent (anti-agglomerating agent)—from 2 to 15, the monofunctional heteroatomic organic compound with the number of carbon atoms from 3 to 16—from 1 to 10, the bifunctional heteroatomic organic compound with the number of carbon atoms from 2 to 16—from 1 to 10. The technical result of the invention is to prepare a product characterized by a high content of the active substance, which is stable and amenable to metering into the pipeline of transported oil or gas condensate at high pressure.

But finely dispersed powder with particles up to 600 microns is used in this solution; the powder is prepared by cryogenic grinding, which requires substantial energy consumption (to reach low temperatures), thorough grinding under these conditions results in partial fracture of the polymer, which deteriorates its drag reducing properties. This finely dispersed powder can also cause the aggregation of particles, so a lot of auxiliary components are required to reduce the aggregation.

SUMMARY

In one aspect of the invention, a reagent for reducing a hydrodynamic drag of a turbulent flow of hydrocarbon liquids in pipelines, comprising the first and the second components, wherein the first component comprises polymer particles with drag reducing properties, a weight content of the first component is from 75 to 99.9 percent, the second component is an anti-agglomerating agent, a weight content of the second component is from 0.1 to 25 percent, a size of the particles is from 1.5 mm to 5 cm.

In additional aspects, it is disclosed that the particle size of the first component is from 2.5 mm to 2.5 cm; the particle size of the first component is from 6 mm to 1.5 cm; the particle size of the first component is from 6 mm to 5 cm; the particle size of the first component is from 1.2 cm to 5 cm; an additional third component has a weight content from 0.5 to 10 percent of a total mass; the third component is at least one of monofunctional heteroatomic organic compounds with a number of carbon atoms from 3 to 16, containing oxygen, nitrogen as a heteroatom, and one of bifunctional heteroatomic organic compounds with a number of carbon atoms from 2 to 16, containing oxygen, nitrogen, sulfur, phosphorus as a heteroatom; the monofunctional heteroatomic organic compound is at least one of isomers of propanol, butanol, pentanol, hexanol, heptanol, octanol, nonanol, decanol, undecanol, dodecanol, tridecanol, tetradecanol, pentadecanol, hexadecanol, isomers of tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine; the bifunctional heteroatomic organic compound is at least one of tripropyl phosphate, tributyl phosphate, tripentyl phosphate, propylene glycol, butylene glycol, butyl cellosolve, hexylene glycol, ethyl cellosolve, texanol, diethylene glycol, triethylene glycol, isophorone, morpholine, dioxane, dimethyl sulphoxide, dimethylformamide; the first component is at least one of polyalphaolefin or polyacrylate; the weight content of the first component is from 90 to 99.9 percent; the particle size ranges from 0.75 to 1.25 about a mean size; the particle size ranges from 0.9 to 1.1 about a mean size; the particle size ranges from 0.95 to 1.05 about a mean size.

The main objects of the claimed invention are to prepare a reagent (drag reducing agent) containing a great amount of an active base to reduce the hydrodynamic drag of a turbulent flow of hydrocarbon liquids, which can be injected in the form of solid particles.

Essentially, a polymer is prepared in the form of a piece with the properties of reducing the hydrodynamic drag, it is ground to a coarse fraction, the size of which ranges from 1.5 mm to 5 cm with the use of a small amount of separating agents, and cryogenic grinding is not used. In another aspect of the invention, polymer particles of size from 1.5 mm to 5 cm are prepared right then. The resulting particles are mixed with a small amount of the separating agent. The DRA prepared according to the above procedure contains a great amount of an active base with a low damaged polymer, a small number of additional components that ensure the preservation of the DRA in the form of separate particles (not as a clump).

The technical result of the solution involves the preservation of the polymer structure (rather than in the case of the DRA ground to finely dispersed powder in a cryogenic mill), so that the polymer is more effective in reducing the hydrodynamic drag, decrease of grinding costs in the production of the DRA (since cryogenic grinding is not required), reducing the aggregation of the DRA while reducing the amount of the separating agent and the need to inject a smaller amount of the reagent to reduce the hydrodynamic drag.

BRIEF DESCRIPTION OF DRAWINGS

FIG. 1 shows a diagram of the introduction of the DRA into an oil pipeline.

DETAILED DESCRIPTIONS OF THE PREFERRED EMBODIMENTS

This section describes the main embodiments of the invention, which, however, do not limit other possible embodiments explicitly described in the application materials and apparent for a person skilled in the art.

The application runs about a polymer having the properties of reducing hydrodynamic drag. Such polymers are made of monomers, which include, but are not limited to alpha-olefins such as 1-hexene, 1-octene, 1-decene, 1-dodecene, 1-tetradecene, etc.; isobutylene; alkyl acrylates; alkyl methacrylates; alkylstyrene, etc. Copolymers of these monomers can also be agents suitable for reducing hydrodynamic drag. Polymers and copolymers of the above monomers are appropriate hydrocarbon drag reducers.

The application does not run about the precision injection of the reagent, since the required and sufficient amount strongly depends on many factors and cannot be specified in advance or in general. For example, some of the parameters that affect the amount of the reagent required include, but are not limited to the chemical composition of the transported hydrocarbon, the temperature of the transported hydrocarbon, the viscosity of the hydrocarbon, the ambient temperature, the temperature of the hydrocarbon, the particular reagent composition.

The terms "a reagent for reducing the hydrodynamic drag" and "a drag reducing agent" are interchangeable herein.

The base for the DRA is any polymer reducing the hydrodynamic drag of liquid hydrocarbons, prepared, for example, according to the method in patent RU2743532C1 (publ. on 19 Feb. 2021), but another proper method for preparing a piece (block) or large polymer particles can be used.

The block polymer prepared according to the known method is ground to the required size using proper grinding equipment, and then mixed with polymer non-dissolving solvents, preparing a product with a polymer content of at least 75 wt. % (preferably at least 90 wt. %), which is fed into the flow of the hydrocarbon liquid pumped through the pipeline using an adapted injection apparatus for bulk polymeric materials.

Alpha-olefins C6-C14, preferably hex-1-ene, oct-1-ene, dec-1-ene, dodec-1-ene, tetradec-1-ene, and mixtures thereof, even more preferably hex-1-ene, dec-1-ene, dodec-1-ene and mixtures thereof containing at least 75 wt % of basic alpha-olefin as well as a monomer selected from the group consisting of acrylates, methacrylates, 2-ethylhexyl methacrylate, isobutyl methacrylate, butyl methacrylate, 2-ethylhexyl acrylate, isobutyl acrylate, butyl acrylate, and combinations thereof, are used as monomers to prepare the block polymers. Other polymers with drag reducing properties, which do not change the essence of the claimed solution, can be used.

Any auxiliary compounds preventing the aggregation of polymer particles are used as a separating agent (anti-agglomerating agent). Certain separating agents can also be antioxidant stabilizers to prevent oxygen degradation of the polymer, for example:

1. Salts of stearic and other fatty acids (sodium stearate, calcium stearate, barium stearate, zinc stearate, cadmium-barium stearate)
2. Fatty alcohols C12-C20
3. Mixture of fatty acid amides (ethylene bistearamide)
4. Pyrogenic silica
5. Hydrated silica (silica white)
6. Esters of C6-C35 alcohols and stearic acid
7. Talc
8. Polymethyl methacrylate powder
9. Polyethylene glycols
10. Polymethylsiloxanes
11. Fatty acids of vegetable oils
12. Mono- and di-glycerides of fatty acids
13. Fatty acid esters (methyl, isopropyl)
14. Oxyalkylated amines (Ethomeen)
15. Oxyalkylated nonyl phenols (Tergitol NP)

To improve the prevention of clumping, a monofunctional heteroatomic organic compound (MHOC) and/or a bifunctional heteroatomic organic compound (BHOC) can be used. The monofunctional heteroatomic organic compound is at least one of the following: isomers of propanol, butanol, pentanol, hexanol, heptanol, octanol, nonanol, decanol, undecanol, dodecanol, tridecanol, tetradecanol, pentadecanol, hexadecanol, isomers of tripropylamine, tributylamine, tripentylamine, trihexylamine, triheptylamine, trioctylamine, trinonylamine, tridecylamine. triundecylamine, tridodecylamine, tritridecylamine, tritetradecylamine, tripentadecylamine, trihexadecylamine. The bifunctional heteroatomic organic compound (BHOC) is at least one of the following: tripropyl phosphate, tributyl phosphate, tripentyl phosphate, propylene glycol, butylene glycol, butyl cellosolv, hexylene glycol, ethyl cellosolv, texanol, diethylene glycol, triethylene glycol, isophorone, morpholine, dioxane, dimethylsulfoxide, dimethylformamide.

If the polymer particles do not have clumping properties (do not stick to each other), then only a separating agent is used as an additional component of the DRA in some embodiments, for example, the anti-agglomerating agents listed above (without heteroatomic organic compounds).

For mechanical mixing of polymer particles with additional components, mixers for powder polymer materials of any design suitable for the particles of the claimed DRA can be used, for example, GEBRUDER LODIGE MASCHINENBAU GMBH (Germany), Hosokawa Alpine AG (Germany), OOO Sibprommash (the Russian Federation, Novosibirsk).

This application implies that the particle size is the maximal size since they have an irregular shape, the particles have different sizes in different measurements, but since they are prepared by grinding one piece at different equipment, it can be expected that the sizes along the X, Y, Z axes of such particles are approximately the same, and the maximal size determines the size of the particles. Large particles contain more polymer, which is low damaged due to cryogenic grinding; therefore, such a polymer has better drag reducing properties compared to the polymer finely ground in a cryogenic mill. The only drawback of the commodity form is the difficult introduction of the DRA large particles into the pipeline, but this problem can be solved by the selection of proper injection equipment.

For dosing the DRA, injection apparatus can be used that mechanically move the agent through appropriately sized screw or screw feeder of Krauss Maffei Berstorff AG (Germany), Leistritz Extrusionstechnik GmbH (Germany) or analogs, as well as apparatus that accelerate the dissolution of materials in hydrocarbons, for example, IKA®-Werke GmbH & Co. KG (Germany), Kinematika AG (Switzerland) or analogs.

In this description, the DRA is a mixture of particles, which mostly have a splintered form, the particle size ranges from 1.5 mm to 5 cm. The particle size varies about the mean in a wide range, it is preferable to prepare particles of a size range plus or minus 20-25% about the mean, more preferably plus or minus 10% about the mean, and even more preferably plus or minus 5% about the mean, to make the introduction of the DRA into the pipeline easy and to perform more precise injection of the DRA.

The advantageous effect of the DRA is achieved when using the DRA particles of any claimed size, for example, in the range of 1.5 mm-5 cm, more preferably 2.5 mm-2.5 cm, even more preferably 4 mm-1.5 cm, even more preferably 6 mm-9 mm. These preferable ranges ensure the preservation of polymer structure and easy injection.

Since the large particle size provides the claimed advantageous effect to a greater extent, it is recommended to prepare particles in the following ranges: 2.5 mm-5 cm; more preferably 4 mm-5 cm; even more preferably 6 mm-5 cm; even more preferably 9 mm-5 cm. The upper limit is determined by the difficult use of the DRA, for example, more than 5 cm sized particle can be injected only by a large screw, which makes it difficult to perform the precise injection, the dissolution is slow, and it may be inappropriate to use them in real conditions. However, the larger the particle size, the fewer components are required to be added to the DRA and the more undamaged polymers it contains.

If the particle size is nearly 5 cm, the mass of the separating agent becomes extremely small compared to the mass of the polymer, since the required amount of the agent mostly depends on the surface area of the polymer particles; for a particle conventionally represented as a cube with a side length of 5 cm, the area is 150 square centimeters, and for 125 cubes with a side length of 1 cm (this cube and the cube with a side length of 5 cm share a similar mass), the surface area is 750 square centimeters (5 times larger). Since the mass of the separating agent is proportional to the surface area that it must cover, the mass of the separating agent for the large particles can be up to 0.1% of the DRA total mass.

DETAILED DESCRIPTION OF THE PREFERRED EMBODIMENTS

Embodiment 1

In this embodiment, the polymer is prepared by polymerization of C6-C14 alpha-olefins over the catalyst and a catalyst activator. In this case, microspherical titanium trichloride is used as a catalyst, and a mixture with a mass ratio of 1:10 to 10:1 of diethylaluminum chloride and triisobutylaluminum is used as a catalyst activator.

By doing so, blocks polymers of any size are prepared, which are then ground, for example, using a two-shaft or four-shaft shredder or another proper shredder. A special feature is that the grinding is performed under normal conditions, the result is a fraction, the size of which depends on the parameters of the shredder. As a rule, residual components of the block polymer are trace amounts, which are not the DRA components and do not affect the effective use of the DRA.

Unlike prior art solutions, there is no need to prepare a finely dispersed powder, therefore, there is no need to use cryogenic grinding, which considerably preserves the polymer structure (which ensures better hydrodynamic drag reducing) and saves energy for the grinding stage.

The resulting particles are mixed with the anti-agglomerating agent, and MHOC, BHOC if appropriate, these components are necessary to prevent the aggregation of particles into a single agglomerate during storage and transportation to the place of use. Since, if the mass is similar, the surface area of large polymer particles is much smaller than the surface area of the finely dispersed powder, so less amount of the anti-agglomerating agent, MHOC, BHOC is required. Fewer additional components introduced into the flow of petroleum products can be useful in the process of preparing pure end products from oil.

There are various options for the quantitative ratio of the DRA components, but since it is the polymer that provides the advantageous effect in the form of drag reduction, so practically the percentage of a polymer is maximized and the percentage of additional components is minimized in the DRA.

Embodiments in which the DRA contains from 75 to 99% polymer are preferred, and even more preferred embodiments are those in which the DRA contains 90 to 99.9% polymer.

As a rule, when using large polymer particles, there is no need to use MHOC, BHOC, and the DRA is a mixture of polymer particles and a separating agent. Moreover, the larger the particle is, the less separating agent is used per unit mass of the DRA.

Use of the Prepared DRA in the Process of the Transportation of Petroleum Products The use of the DRA to reduce the flow drag is shown in FIG. 1, in which the DRA particles are loaded into the DRA source 101, which is a container with a stirrer and a screw feeder that transports the DRA to pre-dissolution unit 102.

There are various embodiments of pre-dissolution unit 102, it may consist of various built-in grinders (conical, vibro-cavitation colloid, rotary-hammer colloid, rotary-pulsation colloid mill, roller or disk mill), several dissolution chambers (the injection is performed from one of the chambers, and a slurry of the DRA and petroleum product is prepared in the other one, then the injection is performed from the second chamber, and the slurry is prepared in the first chamber). It is possible to make the combinations of these embodiments and additions to them, which do not require the creative efforts of a person skilled in the art.

The task of the pre-dissolution unit is to prepare a mixture of a polymer and petroleum product, which can be introduced into oil pipeline 103 using dosing unit 104. Since it is impossible to inject especially large particles of solid DRA into pipeline 103, as they agglomerate in it and will not give an expected effect, the required amount of DRA is pre-dissolved in the petroleum product separated from the main flow that has been marked by an arrow in FIG. 1.

After the required amount of DRA is dissolved in unit 102, the petroleum product with the dissolved DRA is fed to oil pipeline 103 through unit 04. Dosing unit 104 is a pump, preferably a gear pump, but its type is insignificant, it should only ensure pumping of liquid under the required pressure (higher than the pressure in pipeline 103).

In case of large particle size of DRAs, dosing problems can arise, which are generally solved by using screws with a large diameter, which can reliably transport particles up to 5 cm. The weight of the DRA transported from source 101 to unit 102 is controlled with the use of scales, on which source 101 can be put. Since the dosing range of large DRA particles can be significant due to the heavy weight of these particles, it is recommended to use large premixing tanks for accurate dosing. In another embodiment, the amount of DRA injected to oil pipeline 103 is controlled by adjusting the amount of liquid injected by dosing unit 104 into oil pipeline 103 per unit of time. That is, if you control the weight of the dry DRA transported to pre-dissolution unit 102, know the volume of the dissolution chamber, control the amount of the dissolved DRA, you can control the amount of the DRA injected to oil pipeline 103.

The amount of the petroleum product transported to unit 102 is controlled by any liquid flow meter of the appropriate type. The sequential dosing of the DRA and petroleum products is possible. First, some amount of the DRA is fed to pre-dissolution unit 102, since the dosing range of large pieces can be significant in the process of dosing by the screw, then the required DRA/petroleum product ratio is provided by adjusting the volume of the petroleum product, which can be dosed more precisely.

The ratio of the amount of the petroleum product and DRA for pre-dissolution in unit 102 is selected subject to the type of the DRA, the type of the petroleum product, the desired concentration of the DRA in pipeline 103.

To make the dosing easy, it is recommended to use the DRA with a particle size range plus or minus 20-25%, preferably plus or minus 10%, even more preferably plus or minus 5%, since it is more difficult to dose the particles of sizes that differ by 100-200 times, but this requirement is optional since, in some embodiments of the apparatus for injection of the agent, such a range does not critically affect its operation.

Table 1 shows the results of a study of the effectiveness of agents formulated according to the claimed invention.

TABLE 1

| Agent composition | embodiment | | | | | | |
|---|---|---|---|---|---|---|---|
| | 1 | 2 | 3 | 4 | 5 | 6 | 7 |
| Reagent (75 to 99.9) | | | | | | | |
| hex-1-ene | 0 | 75 | 75 | 0 | 50 | 45 | 0 |
| oct-1-ene | 0 | 0 | 0 | 18 | 0 | 0 | 0 |
| dec-1-ene | 75 | 0 | 0 | 72 | 0 | 0 | 90 |
| dodec-1-ene | 0 | 0 | 0 | 0 | 25 | 45 | 0 |
| tetradec-1-ene | 0 | 0 | 0 | 0 | 0 | 0 | 0 |
| 2-ethylhexylmethacrylate | 0 | 0 | 0 | 0 | 0 | 0 | 0 |
| butyl methacrylate | 0 | 0 | 0 | 0 | 0 | 0 | 0 |
| Particle size, mm | 1.5 | 1.5 | 1.5 | 15 | 2 | 10 | 20 |
| ppm | 0.3 | 0.3 | 0.3 | 0.3 | 0.3 | 0.3 | 0.3 |
| Anti-agglomerating agent (0.1 to 25) | | | | | | | |
| hexylene glycol | 6 | 9 | 7 | 3 | 8 | 2 | 5 |
| octanol-1 | 6 | 6 | 5 | 2 | 2 | 0 | 0 |
| Polyethylene glycol | 0 | 0 | 0 | 0 | 0 | 3 | 2 |
| polymethylsiloxane | 0 | 0 | 0 | 0 | 3 | 0 | 0 |
| stearate | 13 | 0 | 10 | 5 | 0 | 0 | 3 |
| Ethylene bistearamide | 0 | 10 | 0 | 0 | 12 | 5 | 0 |
| MHOC (from 0.5 to 10) | | | | | | | |
| butanol | 0 | 0 | 2 | 0 | 0 | 0 | 0 |
| propanol | 0 | 0 | 0 | 0 | 0 | 0 | 0 |
| BHOC (from 0.5 to 10) | | | | | | | |
| tripropyl phosphate | 0 | 0 | 1 | 0 | 0 | 0 | 0 |
| tributyl phosphate | 0 | 0 | 0 | 0 | 0 | 0 | 0 |
| TOTAL | 100 | 100 | 100 | 100 | 100 | 100 | 100 |
| DR (hydrodynamic efficiency) | 31 | 34 | 34 | 36 | 32 | 37 | 35 |

| Agent composition | embodiment | | | | | |
|---|---|---|---|---|---|---|
| | 8 | 9 | 10 | 11 | 12 | 13 |
| Reagent (75 to 99.9) | 95 | 95 | 75 | 90 | 95 | 99.9 |
| hex-1-ene | 95 | 0 | 0 | 0 | 0 | 0 |
| oct-1-ene | 0 | 0 | 0 | 0 | 0 | 0 |
| dec-1-ene | 0 | 47.5 | 0 | 0 | 0 | 99.9 |
| dodec-1-ene | 0 | 0 | 0 | 0 | 0 | 0 |
| tetradec-1-ene | 0 | 47.5 | 0 | 0 | 0 | 0 |
| 2-ethylhexylmethacrylate | 0 | 0 | 75 | 60 | 0 | 0 |
| butyl methacrylate | 0 | 0 | 0 | 30 | 95 | 0 |
| Particle size, mm | 25 | 5 | 4.5 | 5 | 6 | 50 |
| ppm | 0.3 | 0.3 | 2.5 | 2.5 | 2.5 | 0.3 |
| Anti-agglomerating agent (0.1 to 25) | 5 | 5 | 23 | 10 | 5 | 0.1 |
| hexylene glycol | 1.5 | 1.5 | 10 | 1 | 0 | 0 |
| octanol-1 | 0 | 0 | 0 | 0 | 0 | 0 |
| Polyethylene glycol | 1.5 | 0 | 3 | 2 | 0 | 0 |
| polymethylsiloxane | 0 | 1.5 | 0 | 0 | 0 | 0 |
| stearate | 2 | 0 | 10 | 0 | 5 | 0.1 |
| Ethylene bistearamide | 0 | 2 | 0 | 7 | 0 | 0 |
| MHOC (from 0.5 to 10) | | | | | | |
| butanol | 0 | 0 | 0 | 0 | 0 | 0 |
| propanol | 0 | 0 | 0 | 0 | 0 | 0 |
| BHOC (from 0.5 to 10) | | | | | | |
| tripropyl phosphate | 0 | 0 | 2 | 0 | 0 | 0 |
| tributyl phosphate | 0 | 0 | 0 | 0 | 0 | 0 |
| TOTAL | 105 | 105 | 123 | 110 | 105 | 100.1 |
| DR (hydrodynamic efficiency) | 46 | 35 | 34 | 40 | 43 | 41 |

Table 1 shows that the proposed composition has high hydrodynamic efficiency compared to the embodiment without the use of the agent. There is an increase in DR in case of an increase in the particle size of the reagent.

As a result of the study of reducing drag with the use of different sized agents, it was found that, under the same conditions, the agents dosed in the form of crumbs of average particle size 6.5 mm are 5-10% more effective than agents dosed in the form of a powder, the average particle size of which is 0, 33 mm. The results of the hydrodynamic efficiency (DR) measurements are shown in Table 2 below.

TABLE 2

|  | ppm | | | |
| --- | --- | --- | --- | --- |
|  | 0 | 0.3 | 0.6 | 1.2 |
| DR (6.5 mm particles) | 0.0 | 23.0 | 41.0 | 59.0 |
| DR (0.33 mm particles) | 0.0 | 21.0 | 37.0 | 56.0 |

Table 2 shows that in case of a small amount of the agent, the efficiency is about 10%, in case of an increase in the amount of the agent, the efficiency drops to 5%, however, when transporting petroleum products the minimal amount of DRA is usually used.

Embodiment 2

In this embodiment, the polymer is prepared by radical polymerization of acrylic and methacrylic monomers, for example, 2-ethylhexyl methacrylate, butyl methacrylate, butyl acrylate, isodecyl methacrylate, or mixtures thereof. In which case, the emulsion polymerization of acrylates and methacrylates is performed in aqueous media. In which case, persulfates are used as a source of radicals, and reducing agents, for example, Mohr's salt, sodium thiosulfate, etc., are used as initiators.

As a result, a stable latex-like slurry is prepared. At the next stage, the slurry is dried according to any of the available methods, for example, spray drying, disk drying, fluidized bed drying, vacuum drying, to prepare a polymer material with a water content of 0% to 10%. The polymeric material can be in the form of powder, grains, sheets, flakes, or blocks. The powder prepared by drying has a particle size from 1 micron to 1.5 mm and is a commodity form of the finished product, but to transport and store the powder, it should be mixed with a large amount of separating agents. Grains, sheets, flakes, and blocks are ground to a particle size of 1.5 mm-5 cm using shredders or crushing mills, which require fewer separating agents.

The embodiments are not limited to the embodiments described herein, other embodiments of the invention staying within the essence and scope of the present invention will be apparent for a person skilled in the sphere of technologies based on the information set forth and the knowledge of the state of art.

The elements in the singular do not exclude the plurality of the elements unless otherwise specified.

The methods disclosed herein comprise one or more steps or stages to implement the described solution. The steps and/or stages of the method can be substituted for each other staying within the claims of the invention. In other words, if a specific order of steps or stages is not established, the order and/or use of specific steps and/or stages may vary staying within the claims of the invention.

Although exemplary embodiments have been described in detail and shown in the accompanying drawings, it should be understood that such embodiments are illustrative only and are not used to limit the broader invention and that the invention should not be limited to the specific configurations and structures shown and described, as other various modifications may be apparent to the persons skilled in the relevant field.

The features mentioned in various dependent claims, as well as the implementations disclosed in various parts of the description, can be combined to achieve the advantageous effect, even if the possibility of such a combination is not disclosed explicitly.

What is claimed is:

1. A reagent for reducing a hydrodynamic drag of a turbulent flow of hydrocarbon liquids in pipelines, comprising the first and the second components, wherein
   the first component comprises polymer particles with drag reducing properties, a weight content of the first component is from 90 to 99.9 percent, wherein the first component is at least one of poly alpha olefins or polyacrylates,
   the second component is an anti-agglomerating agent, a weight content of the second component is from 0.1 to 10 percent,
   a size of the polymer particles is from 6 mm to 5 cm;
   the anti-agglomerating agent is polymethyl methacrylate powder.

2. The reagent of claim 1, in which the particle size of the first component is from 6 mm to 1.5 cm.

3. The reagent of claim 1, in which the particle size of the first component is from 1.2 cm to 5 cm.

4. The reagent of claim 1, comprising an additional third component having a weight content from 0.5 to 10 percent of a total mass, wherein the third component is at least one of monofunctional heteroatomic organic compounds with a number of carbon atoms from 3 to 16, containing oxygen, nitrogen as a heteroatom, and one of bifunctional heteroatomic organic compounds with a number of carbon atoms from 2 to 16, containing oxygen, nitrogen, sulfur, phosphorus as a heteroatom.

5. The reagent of claim 4, wherein the monofunctional heteroatomic organic compound is at least one of isomers of propanol, butanol, pentanol, hexanol, heptanol, octanol, nonanol, decanol, undecanol, dodecanol, tridecanol, tetradecanol, pentadecanol, hexadecanol, isomers of tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecylamine, trihexadecylamine, the bifunctional heteroatomic organic compound is at least one of tripropyl phosphate, tributyl phosphate, tripentyl phosphate, propylene glycol, butylene glycol, hexylene glycol, texanol, diethylene glycol, triethylene glycol, isophorone, morpholine, dioxane, dimethyl sulphoxide, dimethylformamide.

* * * * *